Patented May 8, 1951

2,551,573

UNITED STATES PATENT OFFICE 2,551,573

PYROLYSIS OF CHLORO-FLUORO ALKANES

Frederick B. Downing, Carney's Point, and Anthony F. Benning and Robert C. McHarness, Woodstown, N. J., assignors, by mesne assignments, to E. I. du Pont de Nemours and Company, a corporation of Delaware No Drawing. Application November 30, 1945, Serial No. 632,116

13 Claims. (Cl. 260—653)

This is a continuation-in-part of our earlier filed applications Serial No. 435,064, now Patent No. 2,387,247, and Serial No. 475,526, filed February 11, 1943.

This invention relates to the preparation of organic fluorine compounds by pyrolysis. By pyrolysis, we mean the transformation of a compound into another substance or other substances through the agency of heat alone. (Hurd, The Pyrolysis of Carbon Compounds, p. 9). The term "pyrolysis" used in this specification therefore will include not only the decomposition of compounds but also the making of more complex compounds. In the applications identified as Benning et al., Serial No. 344,666, filed July 10, 1940, now Patent No. 2,365,516, and Benning Serial No. 379,473, filed February 18, 1941, now Patent No. 2,343,252, are disclosed two processes involving a reaction between a fluoro-hydrocarbon and HCl in the presence of a catalyst. Those reactions may be described as additive, since their apparent course is the addition of HCl to the olefine in the place of double bonds. These reactions were carried out at comparatively low temperatures, in most cases below 350° C., because those temperatures were satisfactory and because observations of a limited number of experiments at higher temperatures showed the existence of what were thought to be undesirable side reactions. We have now discovered that the side reactions are pyrolytic and of a fundamentally different nature than HCl addition, and that they and other reactions that occur at elevated temperatures can be put to valuable use.

It is an object of this invention to produce organic compounds by pyrolysis. Another object of the invention is to produce compounds which are useful, by methods which are economically and technically satisfactory. Another object of the invention is to produce new fluoro hydrocarbons. A particular object of the invention is to synthesize organic compounds having fluoroalkyl chains by the pyrolysis of fluorohalogeno carbon compounds. Another object of the invention is to produce the compound $CF_2=CF_2$ by methods which are technically and economically satisfactory.

According to our invention fluoro-chloro alkanes, which may otherwise be called fluorochloro saturated aliphatic compounds, are made into other compounds by pyrolysis. This reaction may be carried out in isolation, or in the presence of a "catalyst," by which we mean a substance that affects the result without combining with the reactants. Inert gases such as nitrogen and helium may be present as diluents or buffers.

As a starting material we prefer to use aliphatic compounds having at least one fluorine substituent, and having one or more displaceable hydrogen, or chlorine, substituents. Fluorochloro-alkanes, containing at least one displaceable hydrogen, are preferred as starting materials. Among the particular materials that have been pyrolyzed by the process of this invention are those recited in the examples given hereinafter in extenso, and $CH_2ClF$, $CH_3CCl_2F$, $CH_2ClCClF_2$, $C_2HCl_2F_3$ and $CCl_2FCClF_2$. Differences have been observed in the effect of pyrolysis on saturated and unsaturated compounds.

When fluoro-chloro-alkanes, containing one or more displaceable hydrogen atoms, are pyrolyzed, dehydrochlorination predominates. Such dehydrochlorination may be intermolecular or intramolecular, depending upon the relative positions of the hydrogen and chlorine atoms in the molecule. Where the hydrogen and chlorine atoms are on a single carbon, the reaction appears to involve primarily an intermolecular dehydrochlorination, wherein the elements of the hydrogen chloride are obtained from different molecules, to produce free radicals which condense to form compounds of higher molecular weights. For example, when $CHClF_2$ is pyrolyzed, one molecule may lose a hydrogen and another may lose a chlorine to form the free radicals $—CClF_2$ and $—CHF_2$, which radicals may further pyrolyze to the free radical $=CF_2$. Such free radicals condense to form compounds of higher molecular weight, represented by $CF_2=CF_2$, $CClF_2CHF_2$, $C_4F_8$ and the compounds of the series $H(CF_2)_nCl$ in which $n$ is at least 3 with the compounds of increasing molecular weight being produced in diminishing proportions. The compounds of the formula $H(CF_2)_nCl$ are open chain compounds with the H and Cl atoms on opposite terminal carbon atoms and they may be represented more accurately by the formula $HCF_2(CF_2)_nCF_2Cl$ where $n$ represents at least one.

Where the hydrogen and chlorine atoms are on adjacent carbon atoms, the reaction appears to involve primarily an intramolecular dehydrochlorination, wherein both elements of the hydrogen chloride are obtained from the same molecule, to produce fluoro-olefines which have a tendency to polymerize. For example, the pyrolysis of $CClF_2CHF_2$ produces primarily $C_2F_4$ and $C_4F_8$, octafluorocyclobutane.

Where the hydrogen and chlorine atoms are on different non-adjacent carbon atoms, the reaction appears to involve both an intermolecular dehydrochlorination and a splitting of the molecule to produce compounds of lower molecular weight. For example, the pyrolysis of compounds of the formula $H(CF_2)_nCl$ produces $C_2F_4$ and the other lower members of the series $H(CF_2)_nCl$.

Where the fluoro-chloro-alkane contains no hydrogen, the pyrolysis may result in a disproportionation, as for example in the pyrolysis of $CCl_2F_2$ which produces $CF_4$ and $CF_3Cl$ along with other products. In the case of compounds having more than one carbon atom, cleavage may result, followed by reproportionation of the halogen among the fragments e. g. $CF_2Cl$—$CF_2Cl$ yields $CF_2Cl_2$ and $CF_3Cl$ among other products.

The preferred starting materials of our invention are the hydrogen-containing fluoro-chloro-alkanes in which the H and Cl atoms are on a single carbon, and particularly $CHClF_2$. The next most preferred starting materials are the hydrogen-containing fluoro-chloro-alkanes having H and Cl atoms on adjacent carbons.

Although for the production of particular compounds the reaction will be carried out under well-controlled conditions of time, temperature and pressure, complex mixtures of compounds of various molecular weights can be produced by subjecting the compounds to pyrolytic conditions for extended periods of time. Pressures may also be used to vary the results, although for the purposes of economy and safety each particular reaction should be carried out with the lowest pressure consistent with optimum results. For example, pressures of four atmospheres absolute have been found satisfactory in many cases. In general, operations may be carried out at pressures between 0.1 and 10 atmospheres absolute, but other pressures are useful and may be employed when an increase in efficiency will result.

This is a pyrolytic process. The disintegration and integration are produced essentially by heat. It is, therefore, important to select a temperature which will efficiently produce the reaction. The temperature should be selected to give optimum production of the desired product. We have found that excellent pyrolytic results have been produced at temperatures between 600° and 1000° C., but that particular substances have been pyrolyzed at temperatures as low as 400° C. and above 1000° C. under appropriate conditions of time and pressure. Electrical heating is efficient, but any method of heating may be applied. The temperatures which are used must also be chosen in view of the materials that compose the reaction apparatus.

The time of exposure of the reactants to the pyrolytic conditions is a matter of considerable importance where a particular product is desired. Extending the period of exposure frequently produces compounds of increased molecular weight.

In general, the pyrolysis proceeds to the integration of new fluoro hydrocarbons efficiently in the absence of catalysts. Catalysts are generally useful in altering the course of the pyrolysis by splitting off more fluorine, rather than in improving its efficiency. Heavy metal halides and halides of the alkaline earth metals, such as $BaCl_2$ and $CaCl_2$ have been used.

The process is preferably carried out continuously by passing the convertible material through a tube heated to a pyrolytically effective temperature. The tube should be composed of a material which is inert to the reaction and the reaction products. Carbon and the noble metals are sufficiently inert and have proved to be satisfactory materials for the construction of reaction chambers. The chamber need not be wholly composed of the inert material, but may be lined with it. Reaction chambers containing a platinum lining are particularly satisfactory. The process may be carried out in batches rather than continuously, but continuity is preferred.

The following examples have been carried out and have been selected for inclusion in this specification because they show a number of the compounds which have been successfully pyrolyzed, and a number of classes thereof, and a variety of reaction conditions. The applicants present these examples, not as constituting any limitation of the work which has actually been done, but as sufficiently representative to enable persons skilled in the art to practice the invention. In these examples the terms "conversion" and "amount converted" include the assumption that the disappearance of one mol of the primary organic material resulted in the liberation of one mol of halogen acid. This assumption is warranted by the close agreement between the figures for conversion obtained by acid analysis and the actual primary material which disappeared. Unless otherwise noted, the examples were carried out at a pressure of about one atmosphere. The temperatures of the pyrolyses were measured with a thermocouple which was placed in contact with the outer surface of the reaction tube near the center of the heated zone, so that the true average temperature of the gases in the tube may have been somewhat lower than the values given.

*Example I*

One hundred eighty grams of $CHClF_2$ were passed through a silver tube 8.0 mm. I. D. x 700 mm. long at a rate of about 120 g./hr. while the pressure in the tube was kept at approximately one atmosphere abs. The tube temperature was maintained at about 700° C. over an estimated length of 200 mm. by electrical heating. The reaction products were washed with water, dried and condensed in receivers cooled to about −70° C. The crude organic products (156 g.) were separated by fractional distillation and were composed as follows:

| Component | Amount Present, Volume Per Cent |
|---|---|
| $CF_2=CF_2$ (B. P.=−76° C.) | 13.7 |
| $CHClF_2$ (B. P.=−40.8° C.) | 85.7 |
| Material boiling above −40° C | 0.6 |

This was equivalent to a disappearance of 28% of the $CHClF_2$ fed and a yield of $C_2F_4$ therefrom of 83%. Analysis of the washwater for acid indicated that a conversion of 27% had taken place.

*Example II*

$CHClF_2$ was thermally decomposed in an apparatus similar to that described in Example I while being maintained at a pressure of 4 atm. absolute. The organic flow rate was about 387 g./hr., and the operating temperature about 700° C. A conversion of 23% was obtained under these conditions. The acid free organic products had the following analysis:

| Component | Amount Present, Volume Per Cent |
|---|---|
| $C_2F_4$ | 8.5 |
| $CHClF_2$ | 87.7 |
| Material boiling at about −11° C | 1.7 |
| Material boiling at about +20° C | 1.6 |
| Material boiling above +20° C | 0.5 |

Example III $CHClF_2$ containing 2.7 wt. per cent $CHCl_2F$ was passed through a tube which was made of base metal resistant to oxidation at high temperatures and lined with a thin layer of platinum. The flow rate was such that a conversion of about 24% was obtained, while the tube temperature was maintained at about 700° C. The reaction products were analyzed, after removal of acid constituents, and found to contain almost nothing else but $C_2F_4$ and the starting components.

Example IV $CHClF_2$ was passed over a catalyst of activated carbon contained in a nickel jacketed carbon tube, 18.8 mm. I. D. x 600 mm. long. The tube was heated to about 300° C. and the flow of $CHClF_2$ maintained at about 55 g./hr. Under these conditions a 3.5% conversion to other products was obtained as determined by acid analysis. This compares with a conversion of about 1% which was obtained at 525° C. in the absence of any catalyst.

Example V $CHClF_2$ was passed over a catalyst consisting of iron and iron halides formed during pyrolysis contained in a nickel jacketed graphite tube which was heated to about 675° C. The $CHClF_2$ flow rate was such that a conversion of 24% was obtained. Under these conditions, 13 mole per cent of the acid formed was HF. The thermal decomposition of $CHClF_2$ under similar conditions in the absence of a catalyst resulted in the formation of less than 5 mole per cent HF in the acid evolved.

Example VI

The thermal decomposition of $CHClF_2$ in the presence of a catalyst consisting of deoxidized copper and copper halides formed during pyrolysis was carried out in a manner similar to that described in Example V. The results obtained were also similar, the HF content of the acid being raised from less than 5 mole per cent to about 13 mole per cent upon introduction of the catalyst into the graphite tube.

Example VII $CHClF_2$ was passed over a catalyst contained in a nickel jacketed graphite tube heated to about 620° C. The catalyst consisted of an alloy made up of 58% Ni, 20% Fe, 20% Mo and 2% Mn and any of the corresponding metal halides formed during the pyrolysis. The $CHClF_2$ flow rate was such that a conversion of 25% was obtained. Under these conditions 7.5 mole per cent of the acid evolved as HF. Analysis of the reaction products after removal of the catalyst showed a conversion of 26%.

Example VIII $CHClF_2$ (B. P. —40.8° C.) was treated in a manner similar to that described in Example I, the flow rate being maintained at about 57 g./hr. and the temperature at about 700° C. A conversion of 49% was obtained as compared with a conversion of 27% at the higher flow rate used in Example I.

Example IX

Provision was made to operate the apparatus described in Example I at an absolute pressure of 0.5 atm. $CHClF_2$ (B. P. —40.8° C.) was passed through the tube at a rate of about 35 g./hr. and a temperature of about 700° C. The reaction products were washed with water, dried and condensed in receivers cooled to about —70° and —170° C., respectively. Acid analysis showed a conversion of 50%. The composition of the crude was as follows:

| Component | Amount Present, Volume Per Cent |
|---|---|
| $C_2F_4$ | 30.5 |
| $CHClF_2$ | 67.8 |
| Material boiling above —40° C | 1.7 |

A $C_2F_4$ yield of 89% was obtained.

Example X $CHClF_2$ recovered from a previous pyrolysis was treated in a manner similar to that described in Example I. The temperature was maintained at about 700° C. and the conversion at about 26%. The isolated yield of $C_2F_4$ from the pyrolysis products was found to be 89% of theory. The converted material was found to contain 96 volume per cent of $C_2F_4$.

Example XI

In a large scale pyrolysis of $CHClF_2$ under conditions similar to that used in Example I, a large amount of material boiling above —40° C. was obtained. The following are among the compounds which were isolated and identified. Some of their physical constants are given.

| No. | Compound | B. Pt. °C. | Density | $nD$ | Mol. Wt.[1] Calc. | Mol. Wt.[1] Found |
|---|---|---|---|---|---|---|
| 1 | $HC_3F_6Cl$ | 21 | $d_4^0 = 1.556$ | [2] 1.29 | 186.5 | 193.5 |
| 2 | $HC_4F_8Cl$ | 50 | $d_4^{20} = 1.607$ | <1.30 | 235.5 | 241.8 |
| 3 | $HC_5F_{10}Cl$ | 77 | $d_4^{20} = 1.661$ | 20°<1.30 | 286.5 | 295.8 |
| 4 | $HC_6F_{12}Cl$ | 101 | $d_4^{20} = 1.719$ | 5° 1.3012 | | |
| 5 | $HC_7F_{14}Cl$ | 123 | $d_4^{20} = 1.738$ | 5° 1.3070 | | |
| 6 | $HC_8F_{16}Cl$ | 143 | $d_4^{20} = 1.778$ | 5° 1.3088 | | |
| 7 | $HC_9F_{18}Cl$ | 162-163 | $d_{25}^{25} = 1.81$ | | | |
| 8 | $HC_{10}F_{20}Cl$ | 178 | solid at room temperature | | | |
| 9 | $HC_{11}F_{22}Cl$ | 191 | M. Pt. 52° C | | | |
| 10 | $HC_{12}F_{24}Cl$ | 202-203 | M. Pt. 78-79° C | | | |
| 11 | $HC_{13}F_{26}Cl$ | 213-214 | M. Pt. 86-87° C | | | |
| 12 | $HC_{14}F_{28}Cl$ | 226-228 | M. Pt. 94-95° C | | | |
| 13 | $C_2F_4HCl$ | —10 | V. D. 5.7 g./l. at 27° C | | | |
| 14 | $C_4F_8$ | —5 | V. D. 8.2 g./l. at 27° C | | | |

[1] Assumes PV=RT which for compounds of this type gives a M. W. from 2 to 4% high.

[2] Calculated.

The material, boiling over −40° C., also contained higher boiling members of the series $H(CF_2)_nCl$, probably including those wherein $n$ is 15 to 20, but the amounts obtained were insufficient to permit accurate identification. Several constant boiling mixtures were also found in the pyrolysis material; one of them boiled at about −12° C. and contained about 80 vol. per cent of $C_2HClF_4$; together with a component which boiled at −4° C. and had a molecular weight of about 202. Another azeotrope boiled at about 8° to 9° C. and contained about 90 vol. per cent of $CHCl_2F$. A third constant boiling mixture had a boiling point of 4° C.

*Example XII*

The pyrolysis of $CHClF_2$ was carried out in a platinum-lined Inconel-jacketed nickel tube, 13.7 mm. I.D. x 108 cm. The reaction products were washed with water, dried and condensed in two receivers. The pyrolysis was carried out at 30%, 77% and 100% conversions and the proportion of the various fractions in the high boilers determined by distillation. These results are summarized as follows:

| Conversion, Mol. Per Cent | Pyrolysis Temperature, °C. | Wt. Per Cent of H. B.[1] | Wt. Per Cent of Various Fractions in the H. B. | | | | | |
|---|---|---|---|---|---|---|---|---|
| | | | −12 to −10 | −10 to 0° | 0–15 | 15–25 | 25–50 | 50–165 |
| 30 | 640 | 4.1 | 15 | 55 | 5 | 15 | 2 | 4 |
| 77 | 725 | 17.7 | 15 | 55 | 5 | 15 | 2 | 4 |
| 100 | 835–845 | 22.5 | 1 | 7 | 45 | 6 | 18 | 20 |

[1] This value is the ratio of amount of H. B. obtained to the total $CHClF_2$ passed through the pyrolysis tube.

*Example XIII*

$CHClF_2$ was passed through a nickel-jacketed carbon tube, 18.8 mm. I.D. x 600 mm. long at a rate of 82 g. per hour. The temperature was maintained at about 700° C. and the conversion at about 24%. A coil of gold wire was then placed in the center of the heated zone and the pyrolysis continued for five hours in the presence of the test piece. The conversion and the HF split-off remained the same and no change was noticed in the composition of pyrolysis products. The corrosion rate on this test piece was found to be less than $0.1 \times 10^{-3}$ inches per month penetration. This rate is of the same order of magnitude as that for platinum used under similar conditions for the pyrolysis of $CHClF_2$.

*Example XIV*

A platinum-lined, Inconel-jacketed nickel tube, 42" x 0.5" I.D. was used in the pressure pyrolysis of $CHClF_2$. The pyrolysis temperature was maintained over an estimated length of 20 cm. by electrical heating. The desired pressure and conversion were maintained by control of the temperature and flow of the organic material. The reaction products were then washed, dried and condensed in receivers cooled in carbonice-acetone baths. No attempts were made to collect any of the gases passing through the carbonice-acetone traps. The liquid condensates were then distilled in a laboratory helices-packed column and the amount of $CHClF_2$ destroyed by the process thus determined.

The results of the pyrolysis of $CHClF_2$ under various conditions of temperature, pressure and conversion are given in the table:

| No. | Pressure, Lbs./in.$^2$ Abs. | Pyrolysis of $CHClF_2$ Under Pressure | | |
|---|---|---|---|---|
| | | Pyrolysis, °C. | Percent Conversion | Percent "High Boilers"[1] |
| 1 | 15 | 700 | 25 | 10 |
| 2 | 55 | 650 | 35–38 | 22 |
| 3 | 55 | 740–745 | 78–80 | 43 |
| 4 | 95 | 810–820 | 100 | 27 |
| 5 | 95 | 740 | 75–80 | 32.5 |
| 6 | 95 | 720 | 82 | 35.6 |
| 7 | 95 | 605–620 | 39 | 37.2 |
| 8 | 385 | 660 | 60 | 39.5 |

[1] The percent "high boilers" is based on the amount of $CHClF_2$ which disappeared in the reaction by pyrolysis.

The above table shows that an increase in pressure generally results in the increase of the percentage of "high boilers" obtained in the pyrolysis. Although the composition of these products varied in each run, over a boiling range of −12 to over 190° C., over 65% of the "high boilers" were $H(CF_2)_3Cl$ and $H(CF_2)_4Cl$.

*Example XV*

$CF_3CH_2Cl$ was passed through a platinum tube 2.9 mm. I. D. by 450 mm. long at a rate of about 30 g./hr. The temperature of the tube was maintained at 820°–860° C. over an estimated length of 100 mm. by electrical heating. The reaction products were treated as in Example I. Analysis of the wash water showed that a 55% conversion had taken place at 860° C. The crude organic products had a distillation range of from −46° to +85° C. The starting material had a boiling point of +6.1° C.

*Example XVI*

$CF_3CH_2Cl$ was passed through a platinum-lined Inconel-jacketed nickel tube, 13.7 mm. I. D. x 108 cm., at a rate of about 110 g. per hour while the temperature in the tube was kept at about 615° C. over an estimated length of 200 mm. by electrical heating. The reaction products were washed with water, dried and condensed. Acid analysis showed a conversion of about 52%. The following compounds were isolated and identified in the product:

$CHF_3$ (B. P. −81° C.) with a vapor density of 2.217 g. per liter at 22° C. and 590 mm.

$C_3H_3F_5$ (B. P. −19.6°) with a vapor density of 5.06 g. per liter at 27° C. and 760° mm.

$C_4H_3ClF_6$ (B. P. 35–36°) with a vapor density of 5.272 g. per liter at 24° C. and 480 mm.

*Example XVII*

$CHCl_2F$ was passed through a platinum-lined tube similar to that described in Example I at a rate of 121 g. per hour and with a tube temperature of about 675° C.

Dichlorodifluoroethylene ($C_2Cl_2F_2$), B. P. 21–22° C., $C_2Cl_4F_2$, B. P. 92–93° C., and $C_3H_2Cl_3F_3$, B. P. 108° C., were isolated and identified in the product.

*Example XVIII*

$CH_3CClF_2$ was passed through a platinum-lined Inconel-jacketed nickel tube, 13.7 mm. I. D. x 108 cm. long, at a rate of about 120 g. per hour. The tube temperature was maintained at 715° C. over an estimated length of 200 mm. by electrical heating. The reaction products were washed with water, dried and condensed in two receivers. The first receiver was cooled to about −70° C. while the second receiver was cooled in a bath of liquid nitrogen. Acid analysis of the wash water showed a conversion of about 50%. The pyrolysis of this hydrocarbon proceeded smoothly to the formation of substantially pure $CH_2CF_2$. The boiling point of this material is −82° C., and its vapor density at 28° C. and 756 mm. was 2.58 g. per liter.

*Example XIX*

About 90 g. per hour of $CClF_2CHF_2$ was passed through a platinum-lined Inconel-jacketed nickel tube, 13.7 mm. I. D. x 108 cm., with the tube temperature maintained at about 750° C. The reaction products were washed with water, dried and condensed. $C_2F_4$ (B. P. −76° C.) was isolated and identified. Two other fractions boiling at −40° C. and −12° C., respectively, were obtained. The molecular weights of these fractions were 101 to 157.5, respectively. The fraction, boiling at −12° C., was an azeotropic mixture of $C_4F_8$ (octafluorocyclobutane) and $CHF_2$—$CClF_2$

*Example XX*

About 5 g. per hour of $CH_2\!=\!CClF$ (B. P. −27°) was passed through a platinum-lined Inconel-jacketed nickel tube, 13.7 mm. I. D. x 108 cm. The temperature range covered was from 730 to 930° C. The reaction products were washed with water, dried and condensed in two receivers. This crude reaction product had a boiling range of −30 to +20° C. with definite fractions boiling at about −10° C. and 20° C.

*Example XXI*

$H(CF_2)_3Cl$ (B. P. 21° C.) was passed through a platinum-lined Inconel-jacketed nickel tube, 13.7 mm. I. D. x 108 cm., the flow rate being maintained at about 118 g. per hour and the temperature at about 780° C. Acid analysis showed a conversion of about 46%. A total of about 189 g. of crude organic products were collected. The following compounds were isolated and identified in the pyrolysis products: $C_2F_4$ and $CCl_2F_2$ which have boiling points of −76° C. and −30° C., respectively. Another fraction boiling at −12° C. with an M. W. of 164 was obtained which was an azeotropic mixture of $C_4F_8$ (octafluorocyclobutane) and $CHF_2$—$CClF_2$.

*Example XXII*

In the pyrolysis of $CHClF_2$ to $C_2F_4$ there was obtained some reaction products whose boiling range was from −12° C. to about 250° C. This fraction, designated the "high boilers" and which was a mixture of the compounds having the formula $H(CF_2)_nCl$ was subjected to pyrolysis at 740° C. in a platinum-lined Inconel-jacketed nickel tube, 13.7 mm. I. D. x 108 cm. with the conversion at about 40%. The recovered material was washed, dried and fractionated. The fraction boiling above −12° C. was then subjected to a second pyrolytic treatment under similar conditions as in the first. Although the temperature of the tube was raised to 840° C. the conversion remained fairly constant at 20%. After washing and drying, the pyrolysis material was again fractionated. The successive pyrolyses of the high boilers did not result in the intended building up of carbon chains. Instead there was a definite breakdown in the molecule to produce a mixture, containing the same compounds as the starting mixture but with an increase in the proportion of the lower boiling members. The composition of the original high boilers and those of the pyrolyzed materials was as follows:

| | Composition of H. B. in Wt. Per Cent [1] | | | |
|---|---|---|---|---|
| | −12 to 0° | 0–5° | 5–20° | 30 and above |
| | Per cent | | | |
| Original H. B. | 26 | 36 | 20 | 14 |
| H. B. from 1st Pyrolysis | 26 | 15 | 19 | .7 |
| H. B. from 2nd Pyrolysis | 5 | 57 | 16 | 2 |

[1] Percentage composition based on total "high boilers."

*Example XXIII*

$CCl_2F_2$ was passed through a platinum-lined Inconel-jacketed nickel tube, 19 mm. I. D. x 60″ long at a rate of about 23 g. per hour. The surface temperature was maintained at about 950°–970° C. over an estimated length of 200 mm. by electrical heating. The reaction products were washed with sodium sulfite solution, dried and condensed in receivers cooled to −76° C. followed by a tailing receiver cooled in liquid nitrogen. About 3 g. of $CF_4$ was found in the liquid nitrogen trap. This material had a boiling point of −129° C. and a molecular weight (vapor density method) of 90. (Calculated for $CF_4$, 88.) The −76° condensate, totalling about 66 g., was distilled and the following compounds isolated: about 7 g. of $CF_3Cl$, boiling point −81, also about 1.5 g. of fraction boiling above 40° C. which was not identified. The rest of the condensate was the original starting material, $CCl_2F_2$ boiling at −29° to −30° C. Analysis of the wash water showed the presence of HF, HCl and free chlorine.

*Example XXIV*

$CClF_2CClF_2$ was pyrolyzed in a platinum-lined tube similar to that described in Example XXIII at a tube temperature of about 880° C. About 170 g. of material was passed through in 1.25 hours at a contact time approximating 2–3 seconds. Extensive decomposition was evident and free chlorine was detected. The reaction products were washed free of acid constituents, dried and fractionated. About 100 g. of $CF_3Cl$ and about 12 g. of $CF_2Cl_2$ were isolated and identified. High boiling constituents (boiling above 4° C.) were obtained but were not identified.

The reaction products may be washed with water or alkaline solution to remove acid constituents before condensation and analysis, although this is not necessary. In some cases, it is advantageous to separate certain desired components before acid removal.

The process produces both saturated and unsaturated products. A very important olefine which is efficiently produced by the process is $CF_2=CF_2$, which is a valuable intermediate for refrigerants and plastics. Among the saturated compounds which are produced are mono carbon fluorides, such as $CClF_3$, and fluorides having a plurality of carbon atoms, such as $C_2H_2Cl_3F_3$. The process may also be made to produce compounds in arithmetical series, of which an example is the series of compounds of the formula $C_nF_{2n}HCl$, in which $n$ is 3 or more. Some of the product compounds contain fewer atoms than the starting material and others contain more. By proper selection of the starting material and of the conditions of pyrolysis almost infinitely various results may be obtained. It has been observed that the products tend to increase in stability as they approach saturation by fluorine; for example, the compound $CHF_3$ is very stable; in several cases the substitution of fluorine for chlorine has produced a decrease in the reactivity of the compound. Because of this, the process is a particularly satisfactory method of producing reactions of the type described among fluoro compounds containing chlorine.

The compounds of the series $H(CF_2)_nCl$ wherein $n$ is at least 3 are new and valuable compounds. They are very much more stable to heat and chemical reagents than the next lower homologue whereby they may be employed under conditions, such as reaction media, heat transfer media and the like, where the next lower homologue would not be practical. For example, when $H(CF_2)_2Cl$ is heated to 150° C. under pressure with 1.5 moles of alcoholic potassium hydroxide for 5 hours, part of the material was dehydrochlorinated to $CF_2=CF_2$ and other products. When each of $H(CF_2)_4Cl$, $H(CF_2)_5Cl$ and $H(CF_2)_6Cl$ were treated in the same manner at temperatures as high as 175° C., no dehydrochlorination took place. Also, when $H(CF_2)_2Cl$ was heated with 1.2 moles of zinc dust in an excess of absolute methyl alcohol for 5 hours at 150° C. under pressure, chlorine and fluorine were split out to produce $CHF=CF_2$. When each of $H(CF_2)_3Cl$, $H(CF_2)_4Cl$, $H(CF_2)_5Cl$ and $H(CF_2)_6Cl$ were treated in the same manner at temperatures up to 170° C., no detectable amounts of the corresponding olefine were obtained.

The particular advantage of the invention is that a pyrolytic process has been discovered for the production of new compounds and for the more efficient production of old compounds, which is characterized by its simplicity and the ease with which it may be operated. The invention provides an efficient method of producing organic compounds containing fluorine, particularly fluorinated olefines. These compounds have uses in themselves, such as for refrigerants, anaesthetics, and solvents and are useful as intermediates for the production of alcohols, esters, halides, and alkyl derivatives. A particular advantage of the invention is that the process is most efficient for the production of the valuable compound $CF_2=CF_2$, which is an intermediate of wide utility. The invention is also useful for the synthesis of compounds having more carbon atoms than the compound pyrolyzed, and for the extension of carbon chains. The process involves the pyrolysis of compounds of both light and heavy molecular weight. The pyrolysis has been carried out in both a continuous and a stepwise manner, and a large variety of conditions has been employed, so that it is beyond question that the process is of general application.

As many apparently widely different embodiments of this invention may be made without departing from the spirit and scope thereof, it is to be understood that we do not limit ourselves to the specific embodiments thereof except as defined in the appended claims.

We claim:

1. The process of converting fluoro-chloroalkanes to different fluorine containing organic compounds which comprises pyrolyzing a fluorochloro-alkane of from 1 to 3 carbon atoms containing at least one hydrogen atom and in which each carbon carrying a flourine atom also carries at least one additional halogen atom of the group consisting of chlorine and fluorine, at a temperature between 600° C. and 1000° C.

2. The process of converting fluoro-chloroalkanes to different fluorine containing organic compounds which comprises pyrolyzing a fluorochloro-alkane of from 1 to 3 carbon atoms containing both a hydrogen atom and a chlorine atom on a single carbon atom and in which each carbon carrying a fluorine atom also carries at least one additional halogen atom of the group consisting of chlorine and fluorine, at a temperature between 600° C. and 1000° C.

3. The process of converting fluoro-chloroalkanes to different fluorine containing organic compounds which comprises pyrolyzing a fluorochloro-alkane of from 1 to 3 carbon atoms containing a hydrogen atom and a chlorine atom on adjacent carbon atoms and in which each carbon carrying a fluorine atom also carries at least one additional halogen atom of the group consisting of chlorine and fluorine, at a temperature between 600° C. and 1000° C.

4. The process of producing the compound represented by the formula $CF_2=CF_2$ which comprises pyrolyzing the compound represented by the formula $CHClF_2$.

5. The process of producing the compound represented by the formula $CF_2=CF_2$ which comprises pyrolyzing the compound represented by the formula $CHClF_2$ under pressures between 0.1 and 10 atmosphere absolute.

6. The process of producing the compound represented by the formula $CF_2=CF_2$ which comprises pyrolyzing the compound represented by the formula $CHClF_2$ at a temperature between 600° C. and 1000° F. at atmospheric pressure.

7. The process of producing the compound represented by the formula $CF_2=CF_2$ which comprises heating the compound represented by the formula $CHClF_2$ at a temperature of about 700° C. in a platinum reaction vessel, condensing the product, and separating its constituents.

8. The process which comprises pyrolyzing $CHClF_2$ by passing it through a noble metal tube heated to a temperature of about 700° C., washing the reaction products with water, drying the reaction products, condensing them, and subjecting them to fractional distillation.

9. The process which comprises pyrolyzing $CHClF_2$ by passing it through a noble metal tube at a temperature of about 700° C. at a pressure of about four atms. absolute, washing the product with water, drying it, condensing it, and isolating its constituents by fractional distillation.

10. The process of producing the compound represented by the formula $CH_2=CF_2$ which comprises heating $CH_3-CClF_2$ at temperature of from about 600° C. to about 1000° C. for sufficient time to convert a substantial portion of the $CH_3-CClF_2$ to $CH_2=CF_2$.

11. The process of producing the compound represented by the formula $C_2F_4$ which comprises heating $CClF_2-CHF_2$ at temperature of from about 600° C. to about 1000° C. for sufficient time to convert a substantial portion of the CClF₂—CHF₂ to C₂F₄ and other products.

12. A compound represented by the formula:

$$H(CF_2)_nCl$$

in which $n$ is an integer of from 3 to 14.

13. The compound represented by the formula:

$$H(CF_2)_3Cl$$

FREDERICK B. DOWNING.
ANTHONY F. BENNING.
ROBERT C. McHARNESS.

REFERENCES CITED

The following references are of record in the file of this patent:

UNITED STATES PATENTS

| Number | Name | Date |
|---|---|---|
| 1,986,876 | Baxter | Jan. 8, 1935 |
| 2,005,706 | Daudt et al. | June 18, 1935 |
| 2,376,205 | Swaney et al. | May 15, 1945 |

OTHER REFERENCES

McBee et al.: J. A. C. S., vol. 62, pages 3340–1 (1940).

Henne et al: J. A. C. S., vol. 58, pages 402–3 (1936).

Senderens: "Bull. Soc. Chem. de France," 4th Series, vol. 3, pages 823–829 (1908).

Fieser and Fieser: "Organic Chemistry" (1944), page 32.

Gilman: "Organic Chemistry" (2nd ed. 1943), vol. I, pages 956, 959 to 961.

Henne et al.: J. Am. Chem. Soc., vol. 58, pages 882–884 (1936).

Ruff et al.: Zeit. für anorg. und allgemeine Chemie, vol. 201, 256–7 (1931).

Nuckols et al.: Chem. Abs., vol. 28, 2079 (1934).